United States Patent
Streit et al.

(10) Patent No.: US 6,468,075 B2
(45) Date of Patent: Oct. 22, 2002

(54) APPARATUS FOR THERMAL PROCESSING OF RAW MATERIAL IN MEAL FORM

(75) Inventors: Norbert Streit, Siegburg (DE); Carsten Eckert, Cologne (DE); Ralf Filges, Bergisch-Gladbach (DE); Horst Schilling, Cologne (DE)

(73) Assignee: KHD Humboldt Wedag AG, Cologne (DE)

( * ) Notice: Subject to any disclaimer, the term of this patent is extended or adjusted under 35 U.S.C. 154(b) by 0 days.

(21) Appl. No.: 09/883,856

(22) Filed: Jun. 18, 2001

(65) Prior Publication Data
US 2002/0022207 A1 Feb. 21, 2002

(30) Foreign Application Priority Data
Jun. 21, 2000 (DE) .......................... 100 30 613

(51) Int. Cl.[7] .................................................. F27B 7/02
(52) U.S. Cl. ..................................................... 432/106
(58) Field of Search ........................... 432/14, 58, 105, 432/106

(56) References Cited

U.S. PATENT DOCUMENTS

| | | | |
|---|---|---|---|
| 4,080,218 A | | 3/1978 | Mori ........................ 106/100 |
| 4,270,900 A | * | 6/1981 | Shy et al. .................. 432/106 |
| 4,511,333 A | * | 4/1985 | Kunze ....................... 106/750 |
| 4,747,879 A | | 5/1988 | Wolter ...................... 106/100 |
| 6,000,937 A | | 12/1999 | Schilling |

FOREIGN PATENT DOCUMENTS

| | | | |
|---|---|---|---|
| DE | 2325468 | * | 11/1973 |
| DE | 352 2 272 | | 9/1986 |
| DE | 1 973 2 778 | | 11/1998 |
| EP | 0 222 044 | | 12/1985 |

* cited by examiner

Primary Examiner—Jiping Lu
(74) Attorney, Agent, or Firm—Charles L. Schwab; Nexsen Pruet Jacobs & Pollard, LLC

(57) ABSTRACT

Cement clinker production apparatus having a precalcination stage connected upstream of a rotary kiln, in which precalcination stage a CO-containing reduction zone in the rotary kiln off-gas duct is employed for the purpose of reducing the pollutant $NO_x$. In order to make certain that the quantitative ratio of $O_2$ in the rotary kiln off-gas to fuel admitted by a $deNO_x$ burner, and thus control the effectiveness of $NO_x$ reduction, a pivoting throttle valve (33) is positioned in the precalcination stage to control the quantity of rotary kiln off-gas and thus the $O_2$ content in the kiln off-gas. The throttle valve (33) is positioned in the rotary kiln off-gas duct (15) above the $deNO_x$ burner (19), above the raw meal inlet (13), and before the confluence of the tertiary air substream with the rotary kiln off gas. The throttle valve (33) is pivotable about an articulation (34) at the bottom side of the valve so that the flow of the rotary kiln off-gas remains laminar, thus enhancing the reaction length of the CO-containing reduction zone (23).

6 Claims, 2 Drawing Sheets

APPARATUS FOR THERMAL PROCESSING OF RAW MATERIAL IN MEAL FORM

This invention relates to an apparatus for thermal processing of raw materials in meal form, particularly in the production of cement clinker from raw meal, having raw meal preheater, precalcination stage, rotary kiln and clinker cooler, according to the preamble of Claim 1.

In apparatuses for the production of cement clinker from cement raw meal, in order to avoid uneconomically long and/or large in diameter rotary kilns and to hold down the specific heat requirement of the cement clinker production process, it is known to connect upstream of the rotary kiln, as viewed in the material flow direction, a precalcination stage, which is equipped with at least one secondary firing (besides the firing in the rotary kiln). In a known precalcination stage, the rotary kiln off-gas riser supplied with fuel and preheated raw meal, or the gas-solids suspension contained therein is diverted by 90° (U.S. Pat. No. 4,080,218) or by 180° (EP-B-0 222 044) and admitted to the lowermost cyclone of the cyclone suspension preheater system in order to separate the precalcined raw meal from the gas stream. Along with the requirement of the highest possible quality precalcination of the cement raw meal before admission to the rotary kiln, the builders and operators of cement clinker production lines are being confronted at the same time with more stringent requirements as to low emission values for pollutants such as $NO_x$ and CO.

In the known precalcination stages, the rotary kiln off-gas is combined with at least one substream of tertiary air coming from the clinker cooler before admission to the lowermost cyclone of the cyclone suspension heat exchanger. Before this combining, the fuel admitted to the rotary kiln off-gas riser is combusted in richer than stoichiometric fashion, that is, with a deficiency of oxygen, in order to establish a CO-containing reduction zone or CO gas strands for the reduction of the pollutant $NO_x$, which is formed particularly by high-temperature combustion in the rotary kiln (thermal $NO_x$), while the fuel admitted to the adjacent tertiary air duct is combusted in leaner than stoichiometric fashion, that is, with an excess of oxygen (EP-B-0 222 044). The CO not consumed in the $NO_x$ reduction zone of the rotary kiln off-gas duct, as well as any solid fuel particles not initially combusted in the precalcination stage, are then, downstream as viewed in the direction of suspension flow, subjected to secondary combustion with excess oxygen from the tertiary air duct, this residual burnout being promoted by the gooseneck-shaped 180° diversion of the suspension flow in the precalcination stage.

In the known precalcination stages, the effectiveness of the CO-containing reduction zone formed in the rotary kiln off-gas duct depends on the $O_2$ content of the rotary kiln off-gas in relation to the quantity of fuel admitted via the at least one $DeNO_x$ burner. It is understood that this ratio cannot be accurately adjusted by control action on the induced-draft fan that is connected downstream, as viewed in the direction of off-gas flow, of the cyclone suspension heat exchanger system, because, aside from the rotary kiln off-gas, this induced-draft fan simultaneously takes in and exhausts the tertiary air as well. This ratio also cannot be exactly controlled by building an air choke into the tertiary air line in the precalcination stage before the confluence of the tertiary air line into the rotary kiln off-gas duct (DE-A-35 22 272, FIG. 1).

It has also been proposed already (e.g., DE-A-197 32 778, FIG. 6) that a baffle be built into the rotary kiln off-gas riser in a cement clinker production line below the raw meal inlet, which baffle, because of the severe mechanical/thermochemical stress it experiences, is subject to severe wear and therefore is designed as a plate-shaped hollow body through which coolant flows. Its cooling does prolong the service life of the known baffle; if, however, it were built into the CO-containing reduction zone or in the CO-containing gas strands of a rotary kiln off-gas duct equipped with $DeNO_x$ burner, it would introduce turbulence into the laminar character of the gas-solids suspension by vortex formation and thus in undesirable fashion shorten the length of the CO-containing reduction zone, shorten the residence times associated therewith, and ultimately impair the effectiveness of the $NO_x$ decomposition reaction.

In systems for cement clinker production of the above-described kind, having a precalcination stage connected upstream of the rotary kiln, in which precalcination stage a CO-containing reduction zone in the rotary kiln off-gas duct is employed to reduce the pollutant $NO_x$, it is an object of the invention to make certain that the quantitative ratio of $O_2$ in the rotary kiln off-gas to fuel admitted via $DeNO_x$ burner, and thus the effectiveness of $NO_x$ reduction, can be purposely controlled.

According to the invention, this object is achieved with an apparatus having the features of Claim 1. Advantageous developments of the invention are identified in the dependent Claims.

For the purpose of diminishing $NO_x$ in the rotary kiln off-gas in the cement clinker production line according to the invention, with the precalcination stage having at least one $DeNO_x$ burner with rich fuel combustion in the rotary kiln off-gas duct, the effectiveness of the CO-containing reduction zone is not only influenced indirectly by the adjustment of air chokes that can be built into the tertiary air lines coming from the clinker cooler before their confluence into the rotary kiln off-gas duct, and/or by the adjustment of the induced-draft fan that simultaneously exhausts the rotary kiln off-gas and the tertiary air, but according to the invention the fuel-to-oxygen ratio at the $DeNO_x$ burner and thus the effectiveness of the CO-containing reduction zone is directly controlled by building a throttle valve into the rotary kiln off-gas duct above the $DeNO_x$ burner and above the raw meal inlet but before or below the confluence of a tertiary air stream, which throttle valve directly controls the quantity of rotary kiln off-gas and thus the $O_2$ content in the kiln off-gas and thus the CO content in the CO-containing reduction zone.

As the $O_2$ content in the rotary kiln off-gas rises, the throttle valve built into the rotary kiln off-gas duct here is placed in pivoted positions that more strongly throttle the rotary kiln off-gas stream, and conversely. When the rotary kiln off-gas is throttled, its $O_2$ content decreases, and if the quantity of $DeNO_x$ fuel is unchanged, the CO content in the CO-containing reduction zone increases, and conversely. Thus the $O_2$ content in the rotary kiln off-gas, measured in suitable fashion in the rotary kiln inlet chamber, can lie in a range of roughly 1.0% to 3.0%, and the CO content in the CO-containing reduction zone and thus the efficiency of this zone can be controlled in comparatively accurate fashion.

The throttle valve built into the rotary kiln off-gas duct has its pivoting range in the flow direction of the off-gas, that is, the throttle valve articulation is arranged on the bottom side of the valve, on which the off-gas impinges. Within its pivoting range, the throttle valve thus stands perpendicularly to obliquely upwardly. In this way, the character of the flow of rotary kiln off-gas remains laminar in all pivoted positions of the throttle valve, and the length of the CO-containing reduction zone or, respectively, CO-containing strands of off-gas and thus also the residence time of the reactants in this CO-containing cloud remain as long as possible. Furthermore, disturbing material accretions due to flow separations at the throttle valve do not occur.

The service life of the throttle valve in the rotary kiln off-gas, which can have a temperature of approximately 800 to 900° C. after the introduction of the raw meal to be calcined, is further increased if, according to a further feature of the invention, the throttle valve is designed as a plate-shaped hollow body through which a coolant, such as cooling air, cooling water, etc., flows.

The invention and its further features and advantages are explained in greater detail on the basis of exemplary embodiments illustrated schematically in the Figures.

Figure 1:
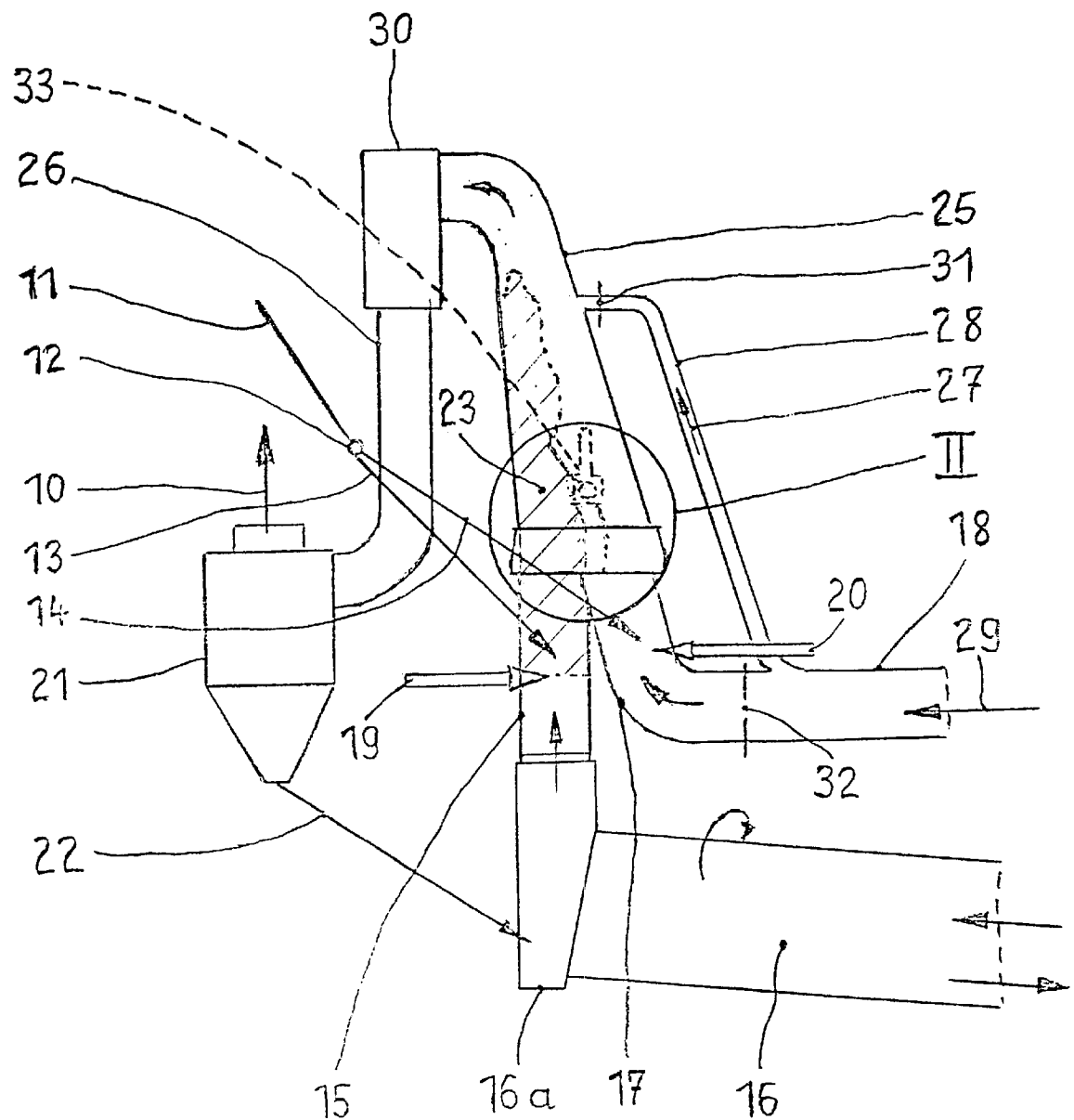
FIG. 1 shows in schematic representation the precalcination stage of an apparatus for the production of cement clinker with lowered $NO_x$ emission.

In the cement clinker production line shown in extracted form in FIG. 1, the cement raw meal is fed at the top to a cyclone suspension preheater system, not shown, where it passes through a plurality of cyclone suspension heat exchangers in succession, in combined cocurrent/countercurrent to hot off-gas 10 of the precalcination stage, to be separated from gas stream 10 in the next-to-last (next-to-lowermost) cyclone and, via supply line 11 in raw meal branch 12, split between two material supply lines 13 and 14. After flowing through the uppermost cyclone of the preheater stage of the cement clinker production line, off-gas 10 cooled against the cement raw meal is exhausted by an induced-draft fan, also not shown.

While raw meal line 13 is confluent into rotary kiln off-gas duct 15, that is, into the off-gas riser of rotary kiln 16, raw meal line 14 is confluent into a tertiary air duct 17, which is supplied with tertiary air from the clinker cooler via tertiary air line 18, which comes from the clinker cooler, not shown, connected downstream of rotary kiln 16. Somewhat below raw meal inlet 13, fuel 19 is admitted to rotary kiln off-gas duct 15 at at least one so-called $DeNO_x$ burner, and fuel 20 can likewise be admitted to tertiary air duct 17 roughly in the region of the inlet of raw meal substream 14. The cement raw meal calcined (deacidified) in the precalcination stage is separated from hot off-gas stream 10 in lowermost cyclone 21 and inlet, as extensively (e.g., 95%) calcined cement raw meal 22, to the inlet chamber of the rotary kiln, in the sintering zone of which it is burned to cement clinker.

In order to form a CO-containing reduction zone in the form of a CO-containing gas strand or CO-containing cloud 23 upwardly adjoining burner 19, which strand or cloud is schematically indicated by right-handed hatching in FIG. 1, fuel 19 admitted into rotary kiln off-gas duct 15 is combusted in rich fashion, that is, with a deficiency of oxygen, with the $O_2$ content of the kiln off-gas in the rotary kiln off-gas upon exiting the rotary kiln, which content is to be measured in suitable fashion in the rotary kiln inlet chamber, and, if appropriate, with supplemental combustion air. In this CO-containing reduction zone 23, the $NO_x$ substantially coming from the rotary kiln firing is reduced, that is, rendered innocuous by decomposition, so that the $NO_x$ emission of off-gas 10 of the precalcination stage is minimized. On the other hand, fuel 20 admitted to tertiary air duct 17 can be combusted in lean fashion, that is, with an excess of oxygen. The residual burnout of the CO remaining in reduction zone 23, initially in excess, and of any hydrocarbons that may remain unburned is effected by oxygen from excess tertiary air delivered via tertiary air duct 17 and, if appropriate, at a location higher in the precalcination stage by further tertiary air, which is delivered via a tertiary air branch line 28 and admitted into the precalcination stage. With the aim of intensive mixing of the reactants in order to promote residual burnout, a swirl chamber or mixing chamber 30 can also be arranged in the region of the gooseneck-shaped precalcination stage where the flow is diverted by roughly 180° from ascending pipeline branch 25 into descending pipeline branch 26.

In order to control the splitting of tertiary air 29 to tertiary air duct 17 and branch line 28 in the desired ratio, control elements such as valves 32 or, respectively, 31 can also be arranged in line 17 or, respectively, in branch line 28.

As can be inferred from the Figures, a pivoting throttle valve 33 is built into rotary kiln off-gas duct 15 above the at least one $DeNO_x$ burner 19 and above raw meal inlet 13, before the confluence of tertiary air line 17, for example roughly in the gore region between rotary kiln off-gas duct 15 and tertiary air duct 17, which throttle valve controls the quantity of rotary kiln off-gas and thus the $O_2$ content in the kiln off-gas by more-or-less strongly constricting the flow of rotary kiln off-gas in such a way that, as the $O_2$ content in the rotary kiln off-gas decreases (more strongly throttling position of throttle valve 33), the CO content in reduction zone 23 and thus the effectiveness of the $DeNO_x$ reaction is increased, and conversely. The pivoted position of throttle valve 33 here is set as a function of the $O_2$ content present in the rotary kiln off-gas, which is most expediently measured in inlet chamber 16a of rotary kiln 16. Thus the measured analysis values of $O_2$ in the rotary kiln off-gas can lie in a range of roughly 1.0% to 3.0%. In addition to or instead of the measured quantity $O_2$ content in kiln off-gas, the measured content of CO (e.g., 0.03% to 1.8% in the kiln inlet chamber) and/or of $NO_x$ in the off-gas can also be employed for the purpose of controlling the pivoted position of throttle valve 33.

Figure 2:
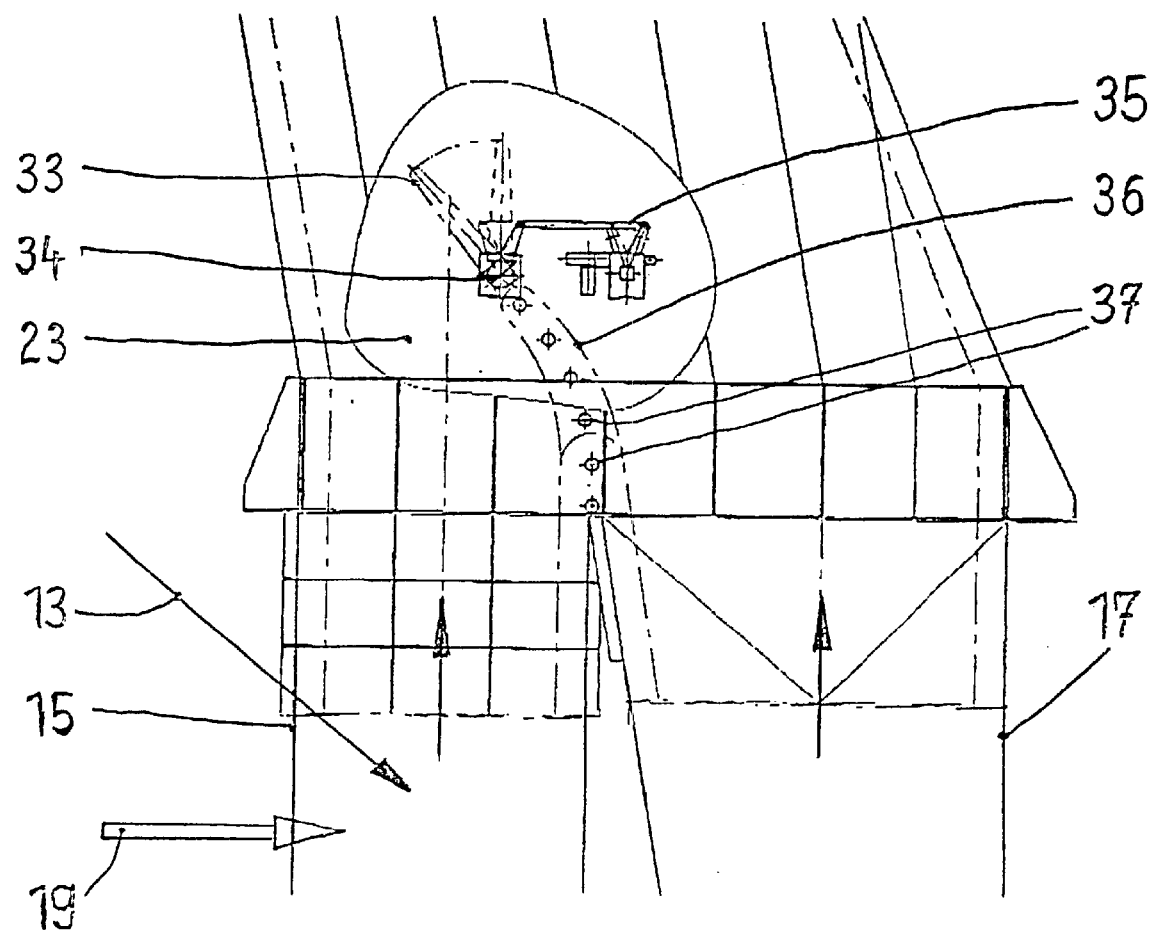
FIG. 2 shows the unit II of FIG. 1 isolated in enlarged representation.

As can further be inferred from the detailed drawing of FIG. 2, the maximal pivoting range of throttle valve 33, starting from its vertically upwardly pointing position, is a maximal angle of roughly 40°. Throttle valve 33 could, however, also be pivoted into tertiary air duct 17 in order to throttle the quantity of tertiary air and, if appropriate, to increase still further the quantity of kiln off-gas flowing in rotary kiln off-gas duct 15. Throttle valve articulation 34 is arranged on the bottom side of the valve, on which the off-gas impinges. In either case, it can be seen from the drawing that the character of the rotary kiln off-gas flow remains laminar even in the so-called "closed" position of the valve, in which throttle valve 33 still leaves free a sufficiently large free flow cross section in the rotary kiln off-gas duct, so that the length of CO-containing cloud 23, continuing upwardly from the $DeNO_x$ burner, and thus also the longest possible residence time of the raw meal for calcination in this reduction zone are preserved.

FIG. 2 also makes it clear that, according to a further feature of the invention, throttle valve 33 can be designed as a plate-shaped hollow body through which a coolant, such as for example cooling air, flows. In this case, the delivery and discharge of the coolant can be effected via articulation shaft 34. It should also be noted that throttle valve 33 or, respectively, articulation shaft 34 is connected to a control element 35 for the purpose of pivoting or rotation. Initially, an upwardly extending refractory lining 36 can be built into the gore region at the junction of rotary kiln off-gas riser 15 and confluent tertiary air line 17, separating the two lines, which lining advantageously has its upper end inclined somewhat into rotary kiln off-gas duct 15, upwardly extending throttle valve 33 then being articulated on the top side of lining 36. For its reinforcement, refractory lining 36 can also have ducts 37, spaced a distance from one another, through which likewise a coolant can flow for the purpose of extending the service life of lining 36.

What is claimed is:

1. An apparatus for thermal processing of raw meal to produce a cement clinker in which said raw meal is preheated in a cyclone suspension heat exchanger system, through which an off-gas stream from an off gas duct (15) of a rotary kiln (16) flows; said raw meal being calcined in a precalcination stage and burned in a sintering zone of said rotary kiln (16) to cement clinker and then cooled in a downstream clinker cooler, said off-gas stream of said rotary kiln (16) and an off-gas stream of tertiary air from said clinker cooler being used to precalcinate raw meal in delivered to said off gas duct (15) by way of a raw meal stream (13) through use of a deNO$_x$ burner (19) which is supplied fuel to produce a rich fuel combustion in the rotary kiln off-gas duct (15) forming a CO-containing reduction zone (23), for the residual burnout of which at least one tertiary air substream is admitted to said rotary kiln off-gas duct (15) by way of tertiary air line (17) at a predetermined downstream juncture point, said apparatus further comprising:

a pivotable vane type throttle valve (33) in said off-gas duct (15) downstream of said deNO$_x$ burner (19), downstream of the raw meal inlet (13) and upstream of the confluence of said tertiary air substream (17) and said rotary kiln off-gas, said throttle valve (33) being pivotally connected on its upstream side to said rotary kiln off-gas duct whereby the flow of rotary kiln off-gas remains laminar in all pivoted positions of said throttle valve (33).

2. The apparatus as set forth in claim 1 wherein said throttle valve (33) includes a hollow body through which coolant flows.

3. The apparatus as set forth in claim 1 wherein said throttle valve (33) is positioned in a gore region at the junction of said rotary kiln off-gas duct (15) and said tertiary air substream (17).

4. The apparatus as set forth in claim 3 having a refractory lining (36) in said gore region, reextending downstream of said junction of said rotary kiln off-gas duct (15) and said tertiary air line (17), said throttle valve (33) being pivotally connected to said refractory lining (36) and being disposed in downstream prolonged relation to said refractory lining (36).

5. The apparatus as set forth in claim 4 having a control element (35) connected to said throttle valve (33) which automatically places said throttle valve (33) in a pivoted position more strongly throttling said stream of rotary kiln off-gas as the O$_2$ content in said rotary kiln off-gas increases, and conversely.

6. The apparatus as set forth in claim 1 having a control mechanism including a control element (35) connected to said throttle valve (33) which automatically pivots said throttle valve (33) to a position more strongly throttling said stream of rotary kiln off-gas as the O$_2$ content of said rotary kiln off-gas increase and conversely.

\* \* \* \* \*